US012516794B1

(12) United States Patent
Zheng

(10) Patent No.: US 12,516,794 B1
(45) Date of Patent: Jan. 6, 2026

(54) EASILY-ASSEMBLED BRACKET LIGHT MODULE

(71) Applicant: JOININ GLOBAL PTE. LTD., Sg (SG)

(72) Inventor: Hongbing Zheng, Hangzhou (CN)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/925,070

(22) Filed: Oct. 24, 2024

(30) Foreign Application Priority Data

Aug. 12, 2024 (CN) ........................ 202421948868.X

(51) Int. Cl.
*F21V 17/16* (2006.01)
*F21K 9/272* (2016.01)
*F21K 9/275* (2016.01)
*F21S 4/20* (2016.01)
*F21V 23/00* (2015.01)
*F21V 23/06* (2006.01)
*F21Y 103/10* (2016.01)
*F21Y 115/10* (2016.01)

(52) U.S. Cl.
CPC ............ *F21V 17/164* (2013.01); *F21K 9/272* (2016.08); *F21K 9/275* (2016.08); *F21S 4/20* (2016.01); *F21V 17/16* (2013.01); *F21V 23/001* (2013.01); *F21V 23/06* (2013.01); *F21Y 2103/10* (2016.08); *F21Y 2115/10* (2016.08)

(58) Field of Classification Search
CPC ......... F21K 9/272; F21K 9/275; F21V 17/164
See application file for complete search history.

(56) References Cited

U.S. PATENT DOCUMENTS 7,052,171 B1 * 5/2006 Lefebvre ................... F21K 9/27 362/651
2015/0300585 A1 * 10/2015 Wu ......................... F21S 8/061 362/222
2017/0102113 A1 * 4/2017 Wu ......................... F21S 8/061
2020/0022241 A1 * 1/2020 Tang ...................... F21V 21/005
2021/0123571 A1 * 4/2021 Cisneros ............... F21V 29/773

FOREIGN PATENT DOCUMENTS

CN 116951338 A * 10/2023

OTHER PUBLICATIONS

Machine translation of CN 116951338 to Wang, S; published Oct. 27, 2023 (Year: 2023).*

* cited by examiner

*Primary Examiner* — William N Harris
(74) *Attorney, Agent, or Firm* — IPRTOP LLC

(57) ABSTRACT

An easily-assembled bracket light module is provided, including a light tube assembly, plugs, and an end cap assembly. The plugs are provided with a first snap-fit assembly and a second snap-fit assembly. The light tube assembly is provided with a third snap-fit assembly, which is matched with the first snap-fit assembly to connect the light tube assembly to the plugs. The end cap assembly is provided with a fourth snap-fit assembly, which is matched with the second snap-fit assembly to connect the end cap assembly to the plugs. The plugs are respectively connected to the light tube assembly and the end cap assembly via a snap-fit, allowing for rapid assembly, high efficiency, and an enhanced user experience. Meanwhile, an input end cap and an output end cap both adopt a screwless snap-fit design for quick assembly and compatibility, and this design meets the certification requirements for the pull force test.

9 Claims, 8 Drawing Sheets

EASILY-ASSEMBLED BRACKET LIGHT MODULE

FIELD OF THE INVENTION

The present disclosure relates to the field of illumination technology, specifically to an easily-assembled bracket light module.

BACKGROUND OF THE INVENTION

As a commonly used lighting fixture, LED bracket lights are widely applied due to their easy installation and low cost. For example, in public places, LED bracket lights are typically installed in corridors and passageways for illumination.

Currently, the assembly efficiency of existing bracket lights is affected by the complex production process of the end caps. This is mainly due to: 1. multiple assembly steps; 2. limited space for welding and placing the driver; 3. accumulation of AC input wires occupying space.

SUMMARY OF THE INVENTION

An easily-assembled bracket light module includes a light tube assembly, plugs, and an end cap assembly. The plugs are provided with a first snap-fit assembly and a second snap-fit assembly. The light tube assembly is provided with a third snap-fit assembly, which is matched and connected with the first snap-fit assembly to connect the light tube assembly to the plugs. The end cap assembly is provided with a fourth snap-fit assembly, which is matched and connected with the second snap-fit assembly to connect the end cap assembly to the plugs.

In one embodiment, the light tube assembly includes a passive light strip, and the end cap assembly is provided with a power supply connection part. The passive light strip is electrically connected to a power supply cord via the power supply connection part.

In one embodiment, the end cap assembly includes an input end cap and an output end cap. The input end cap and the output end cap are respectively connected to the plugs at two ends of the light tube assembly. The power supply connection part comprises a first power supply connection part corresponding to the input end cap and a second power supply connection part corresponding to the output end cap. The first power supply connection part of the input end cap is a wire clamp with a socket, the inner side of the wire clamp is electrically connected to the passive light strip by a wire, and the socket is disposed on the outer side of the wire clamp to allow for a detachable connection between the wire clamp and a power supply plug; or the first power supply connection part of the input end cap is a wire hole for the power supply cord to insert into the light tube assembly and electrically connect with the passive light strip. The second power supply connection part of the output end cap is a wire hole for an output wire connected to the passive light to pass through.

In one embodiment, an inner wall of each of the plugs forms a tubular cavity with openings at both ends. The second snap-fit assembly includes at least two first snap-fit components, and the second snap-fit components are respectively disposed on the inner wall of each of the plugs close to the first end of the tubular cavity.

In one embodiment, at least two pairs of the second snap-fit components are provided, one pair of the second snap-fit components is disposed opposite to each other along a horizontal axis of an end surface of the tubular cavity, and the other pair of the second snap-fit components is disposed opposite to each other along a vertical axis of the end surface of the tubular cavity.

In one embodiment, the fourth snap-fit assembly includes at least two pairs of the fourth snap-fit components. One pair of the fourth snap-fit components is disposed opposite to each other along a horizontal axis of the end cap assembly, and the other pair of the fourth snap-fit components is disposed opposite to each other along a vertical axis of the end cap assembly, so that the fourth snap-fit assembly can connect to the at least two pairs of the second snap-fit components.

In one embodiment, the tubular cavity includes N cylindrical cavities connected to each other, and the inner wall of each of the plugs is provided with at least one connecting boss that protrudes into the interior of at least one of the cylindrical cavities at each connection point between two adjacent cylindrical cavities of the N cylindrical cavities; where N≥2, and N is an integer. The first snap-fit assembly includes at least two first snap-fit components disposed on the connecting boss.

In one embodiment, the light tube assembly includes N light tubes. The third snap-fit assembly includes multiple third snap-fit components disposed at ends of each of the light tubes. Each of the light tubes is inserted into one of the cylindrical cavities, and the light tube assembly is connected to the plugs via the snaps of each of the third snap-fit components and the first snap-fit components.

In one embodiment, the passive light strip includes a light panel, the light panel is made of a linear high-voltage Direct On Board (DOB) aluminum substrate.

In one embodiment, the light tube assembly adopts a dual-color extrusion structure design with a wavy strip structure at the bottom.

As described above, the easily-assembled bracket light module of the present disclosure has the following beneficial effects:

The plugs in the present disclosure are respectively matched and connected to the light tube assembly and the end cap assembly in a snap-fit manner. This allows for rapid assembly, ensures high efficiency, and enhances the user experience. Meanwhile, the input end cap and output end cap adopt a screwless snap-fit design, which can be quickly assembled and matched, and the snap-fit design meets the certification requirements for the pull force test.

The input end cap and the output end cap in the present disclosure facilitate the welding of input and output wires, while the input end cap and the output socket can be pre-processed in advance.

The light tube and the plugs in the present disclosure can be quickly assembled by a snap-fit.

The light tube in the present disclosure adopts a dual-color extrusion structure design with a wavy strip structure at the bottom, which can assist in the heat dissipation of the LED light source.

The light panel in the present disclosure adopts a linear high-voltage DOB scheme, while the driver and the LED light panel share a common substrate, eliminating the need for welding operations and reducing the drive assembly welding process.

The backs of the plugs in the present disclosure are provided with a cruciform opening slot, which, with the accompanying accessories, can achieve either suspension or ceiling-mounted installation methods.

REFERENCE NUMERALS

Figure 1:
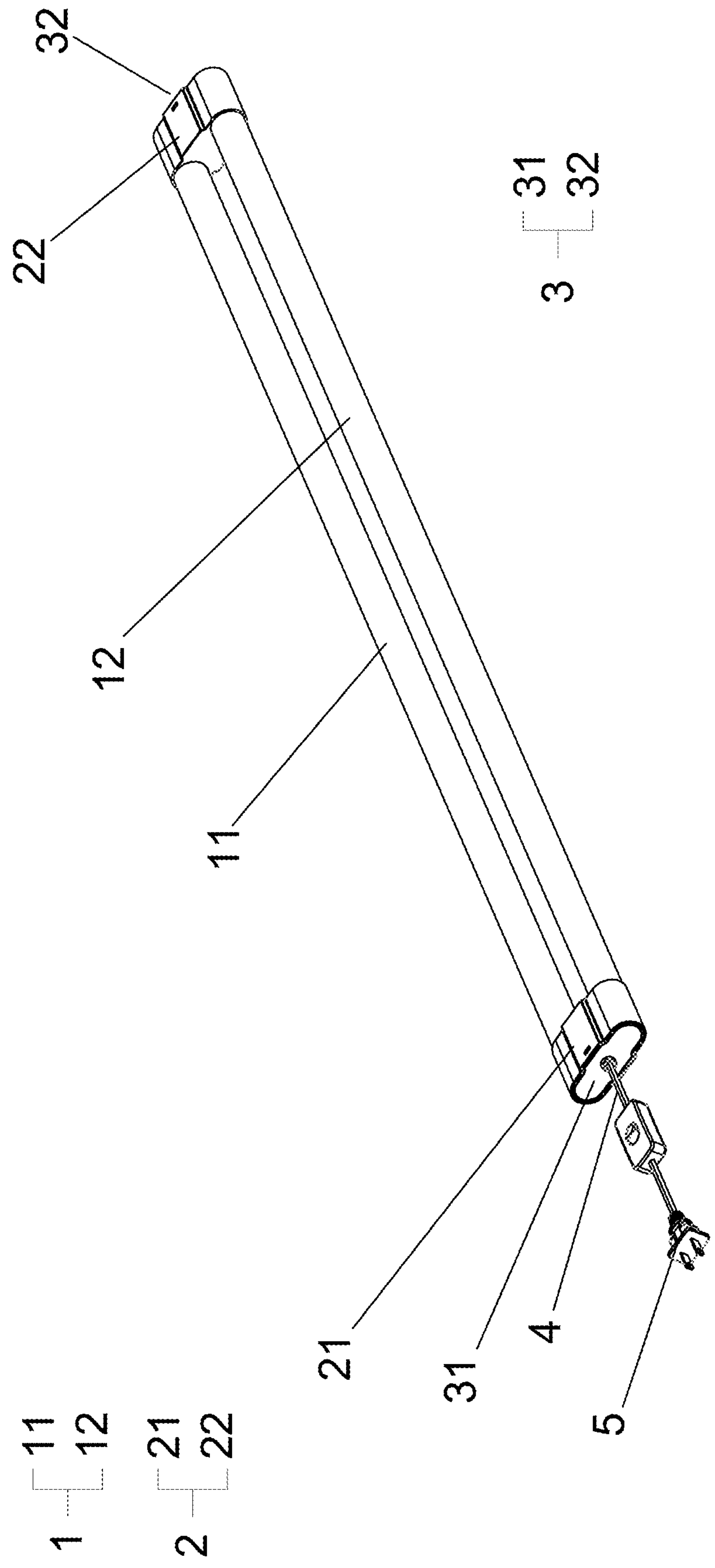
FIG. 1 is a schematic structural diagram of an easily-assembled bracket light module according to one embodiment of the present disclosure.
Figure 2:
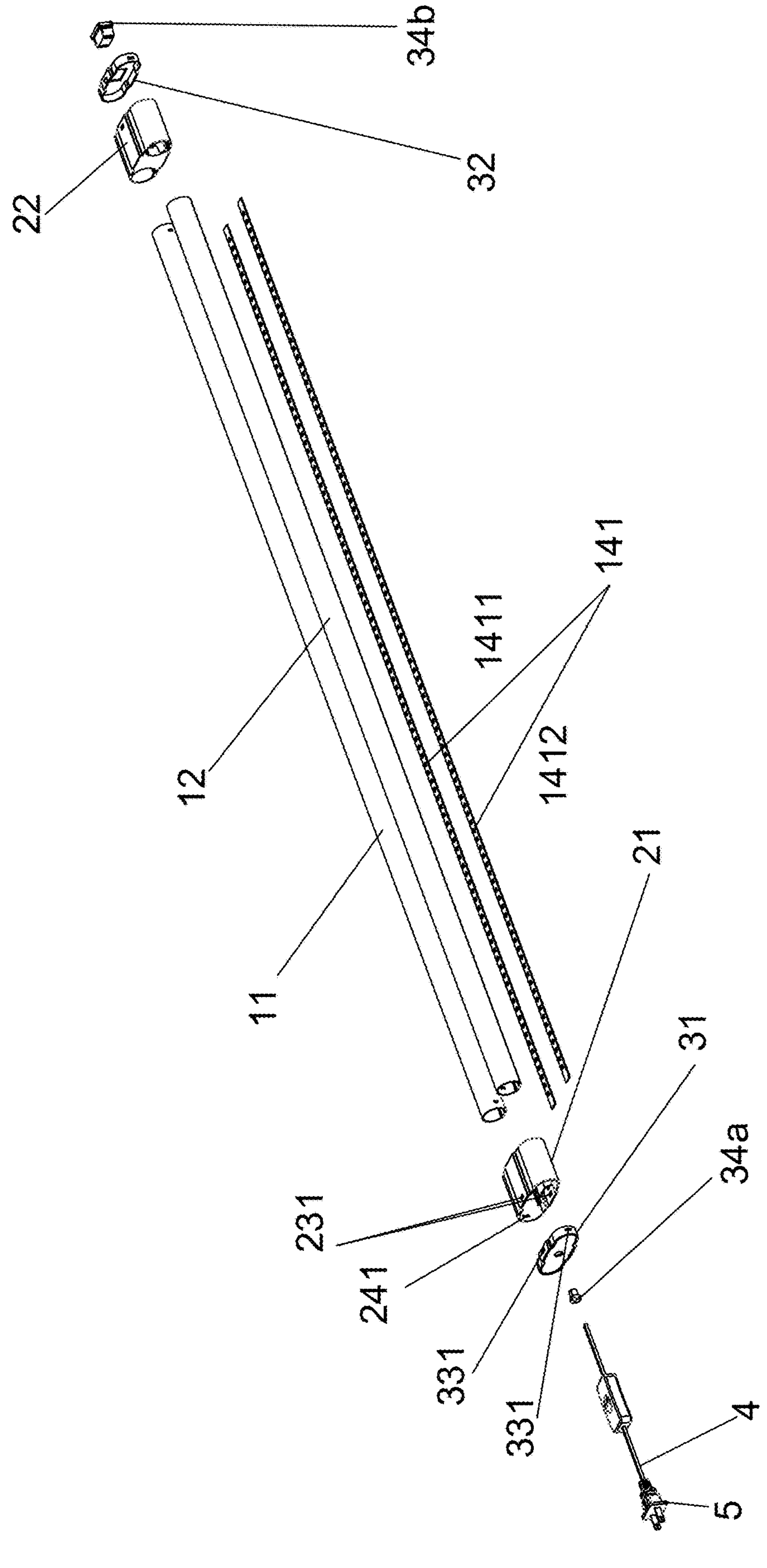
FIG. 2 is a schematic exploded diagram of an easily-assembled bracket light module according to one embodiment of the present disclosure.

1 Light tube assembly
11 First light tube
12 Second light tube
13 Third snap-fit assembly
131 Third snap-fit component
14 Passive light strip
141 Light source panel
1411 First light source panel
1412 Second light source panel
2 Plugs
21 First plug
22 Second plug
23 First snap-fit assembly
231 First snap-fit component
24 Second snap-fit assembly
241 Second snap-fit component
25 Tubular cavity
251 Cylindrical cavity
252 Connecting boss
3 End cap assembly
31 Input end cap
32 Output end cap
33 Fourth snap-fit assembly
331 Fourth snap-fit component
34 Power supply connection part
34*a* Wire clamp
34*b* Wire hole
4 Power supply cord
5 Power supply plug

DETAILED DESCRIPTION

The specific embodiments are described below to illustrate the implementation of the present disclosure, and those skilled in the art can easily understand other advantages and effects of the present disclosure from the content disclosed in this specification. The present disclosure can also be implemented or applied in other specific embodiments. The details provided in this description can be modified or altered in various ways based on different perspectives and applications without departing from the spirit of the present disclosure. It should be noted that the embodiments and features of the embodiments in the present disclosure can be combined with each other as long as there is no conflict.

It should be noted that the illustrations provided in the following embodiments are merely schematic representations to explain the basic concepts of this application. Therefore, the figures only show components related to this application and are not drawn according to the actual number, shape, and size of components in practice. The actual implementation may involve variations in the type, quantity, and proportions of the components, and the layout of the components could be more complex.

The following embodiments of the present disclosure provide an easily-assembled bracket light module that solves the problems of complicated assembly and low efficiency in bracket lights in the prior art.

The principle and implementation of the easily-assembled bracket light module of the present disclosure will be described in detail below with reference to the accompanying drawings, so that people skilled in the art can understand the easily-assembled bracket light module of the present disclosure without creative efforts.

As shown in FIG. 1, this embodiment provides an easily-assembled bracket light module. The bracket light module includes a light tube assembly 1, plugs 2, and an end cap assembly 3.

The plugs 2 are provided with a first snap-fit assembly 23 and a second snap-fit assembly 24.

The light tube assembly 1 is provided with a third snap-fit assembly 13, which is matched and connected with the first snap-fit assembly 23 to connect the light tube assembly 1 to the plugs 2.

The end cap assembly 3 is provided with a fourth snap-fit assembly 33, which is matched and connected with the second snap-fit assembly 24 to connect the end cap assembly 3 to the plugs 2.

The light tube assembly 1 is connected to the plugs 2 in a snap-fit manner.

The light tube assembly 3 is connected to the plugs 2 in a snap-fit manner.

The plugs in the present disclosure are respectively matched and connected to the light tube assembly and the end cap assembly in a snap-fit manner. This allows for rapid assembly, ensures high efficiency, and enhances the user experience. Meanwhile, an input end cap and an output end cap of the end cap assembly 3 both adopt a screwless snap-fit design for quick assembly and compatibility, and the snap-fit design meets the certification requirements for the pull force test.

In one embodiment of the present disclosure, an inner wall of each of the plugs 2 forms a tubular cavity 25 with openings at both ends.

In one embodiment of the present disclosure, the tubular cavity 25 includes N cylindrical cavities 251 connected to each other, and the inner wall of each of the plugs 2 is provided with at least one connecting boss 252 that protrudes into the interior of at least one of the cylindrical cavities at each connection point between two adjacent cylindrical cavities; where $N \geq 2$, and N is an integer.

In one embodiment of the present disclosure, the first snap-fit assembly 23 includes at least two first snap-fit components 231 disposed on the connecting boss 252.

In one embodiment of the present disclosure, the second snap-fit assembly 24 includes at least two second snap-fit components 241, and the second snap-fit components 241 are respectively disposed on the inner wall close to a first end of the tubular cavity 25.

As shown in FIGS. 2-8, in an example, the plugs 2 include a first plug 21 and a second plug 22, and the structures of the first plug 21 and the second plug 22 are the same. Each of the inner walls of the first plug 21 and the second plug 22 forms a tubular cavity with openings at both ends.

The tubular cavity 25 includes two cylindrical cavities 251 connected to each other. Each of the inner walls of the first plug 21 and the second plug 22 is provided with at least one connecting boss 252 that protrudes into the interior of at least one of the cylindrical cavities at the connection point between two adjacent cylindrical cavities.

Each of the first plug 21 and the second plug 22 is provided with a first snap-fit assembly 23 and a second snap-fit assembly 24.

The first snap-fit assembly 23 includes at least two first snap-fit components 231, and the first snap-fit components 231 are respectively disposed on the connecting boss 252 of the inner wall of each of the first plug 21 and the second plug 22.

The second snap-fit assembly 24 includes at least two second snap-fit components 241, and the second snap-fit components 241 are respectively disposed on the inner wall close to the first end of the tubular cavity of each of the first plug 21 and the second plug 22.

In one embodiment of the present disclosure, at least two pairs of the second snap-fit components 241 are provided. One pair of the second snap-fit components 241 is disposed opposite to each other along a horizontal axis of an end surface of the tubular cavity, and the other pair of the second snap-fit components 241 is disposed opposite to each other along a vertical axis of the end surface of the tubular cavity.

In one embodiment of the present disclosure, the light tube assembly 1 includes N light tubes. The third snap-fit assembly 13 includes multiple third snap-fit components 131 disposed at ends of each of the light tubes. Each of the light tubes is inserted into one of the cylindrical cavities 251. The light tube assembly 1 and the plugs 2 are connected via the snaps of each of the third snap-fit components 131 and the corresponding first snap-fit components 231.

In one implementation, two light tubes are used as an example for description, i.e. the light tube assembly 1 includes a first light tube 11 and a second light tube 12.

Each of the first light tube 11 and the second light tube 12 is provided with the third snap-fit assembly 13, and the third snap-fit assembly 13 is matched and connected with the first snap-fit assembly 23, so that the light tube assembly is mounted on the plugs.

The third snap-fit assembly 13 includes multiple third snap-fit components 131, and the third snap-fit components 131 are respectively disposed at the ends of each of the first light tube 11 and the second light tube 12.

The third snap-fit components 131 at one end of the first light tube 11 are matched and connected with the first snap-fit components 231 at one of the cylindrical cavities of the first plug 21. The third snap-fit components 131 at the other end of the first light tube 11 are matched and connected with the first snap-fit components 231 at one of the cylindrical cavities of the second plug 22.

The third snap-fit components 131 at one end of the second light tube 12 are matched and connected with the first snap-fit components 231 at another one of the cylindrical cavities of the first plug 21. The third snap-fit components 131 at the other end of the second light tube 12 are matched and connected with the first snap-fit components 231 at another one of the cylindrical cavities of the second plug 22, so that the light tube assembly is connected to the plugs.

In one embodiment of the present disclosure, the first snap-fit components are snaps, the third snap-fit components are slots, and the first snap-fit components are matched and connected to the third snap-fit components.

In one implementation, the first snap-fit assembly 23 includes multiple snaps, and the snaps are respectively disposed on the connecting boss of each of the cylindrical cavities of the first plug 21 and the second plug 22. The third snap-fit assembly 13 includes multiple slots, and the slots are respectively disposed at the ends of the first light tube 11 and the second light tube 12.

The slots at one end of the first light tube 11 are matched and connected with the snaps at one of the cylindrical cavities of the first plug 21. The slots at the other end of the first light tube 11 are matched and connected with the snaps at one of the cylindrical cavities of the second plug 22. The slots at one end of the second light tube 12 are matched and connected with the snaps at another one of the cylindrical cavities of the first plug 21. The slots at the other end of the first light tube 12 are matched and connected with the snaps at another one of the cylindrical cavities of the second plug 22.

In one embodiment of the present disclosure, the first snap-fit components are slots, the third snap-fit components are snaps, and the first snap-fit components are matched and connected to the third snap-fit components.

In another implementation, the first snap-fit assembly 23 includes multiple slots, and the slots are respectively disposed on the connecting boss of each of the cylindrical cavities of the first plug 21 and the second plug 22. The third snap-fit assembly 13 includes multiple snaps, and the snaps are respectively disposed at the ends of the first light tube 11 and the second light tube 12.

The snaps at one end of the first light tube 11 are matched and connected with the slots at one of the cylindrical cavities of the first plug 21. The snaps at the other end of the first light tube 11 are matched and connected with the slots at one of the cylindrical cavities of the second plug 22. The snaps at one end of the second light tube 12 are matched and connected with the slots at another one of the cylindrical cavities of the first plug 21. The snaps at the other end of the second light tube 12 are matched and connected with the slots at another one of the cylindrical cavities of the second plug 22.

It should be noted that there are no specific limitations on the structure, position, and quantity of the first snap-fit assembly on the first plug and the second plug, as well as the structure, position, and quantity of the third snap-fit assembly on the first light tube and the second light tube, provided that the structures and positions of the first snap-fit assembly and the third snap-fit assembly match and their quantities are equal.

Figure 5:
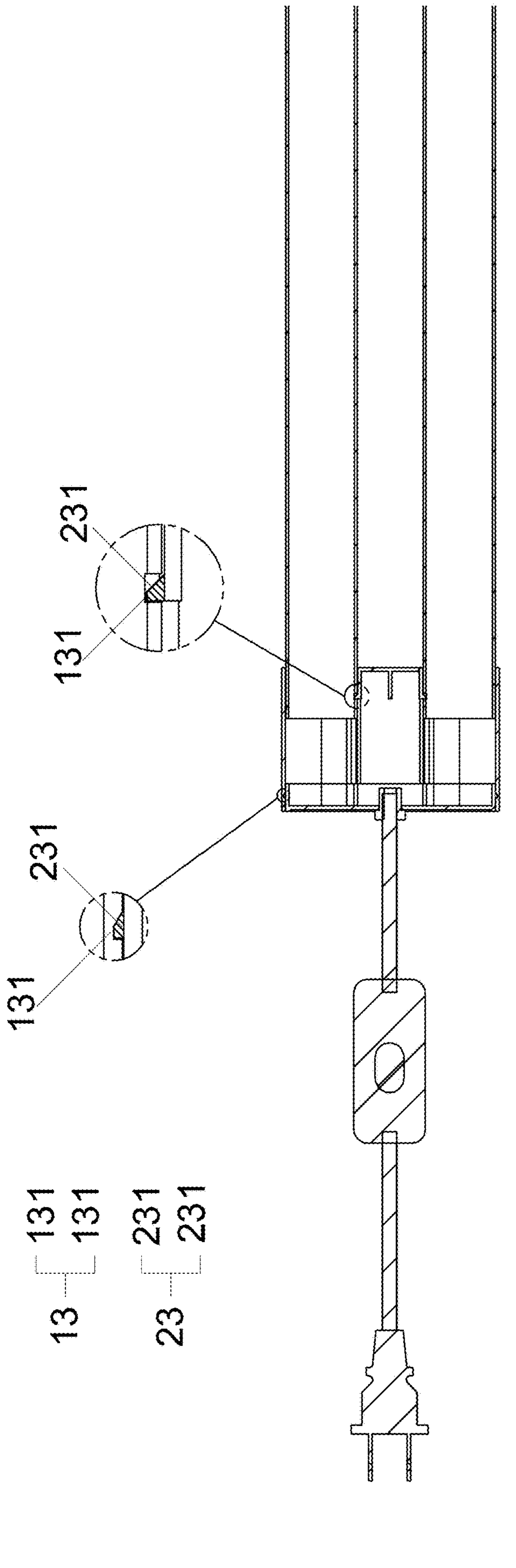
FIG. 5 is a top cross-sectional view of FIG. 1.
Figure 6:
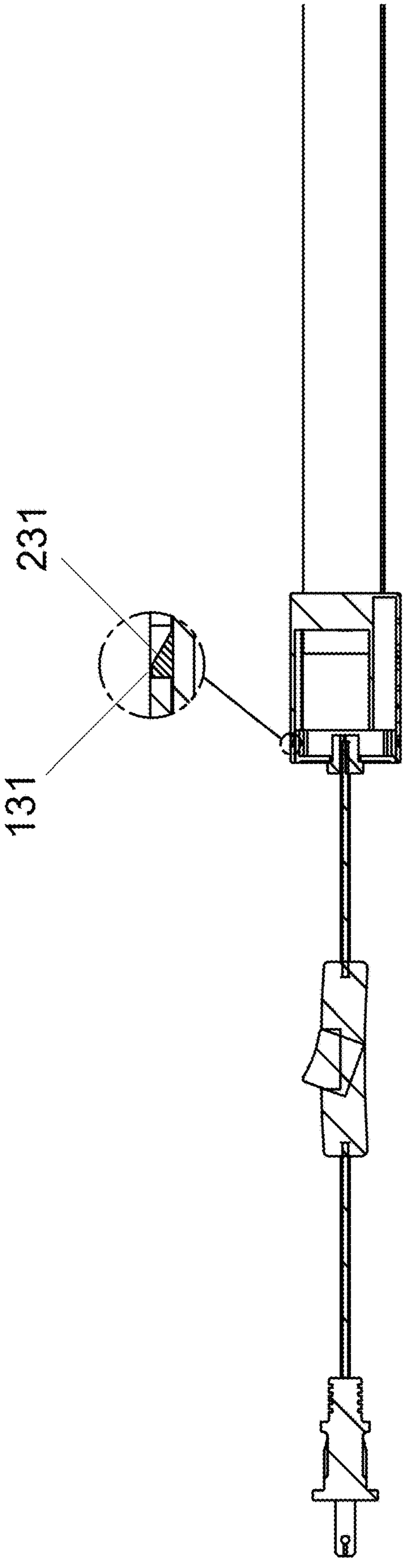
FIG. 6 is a left cross-sectional view of FIG. 1.
Figure 7:
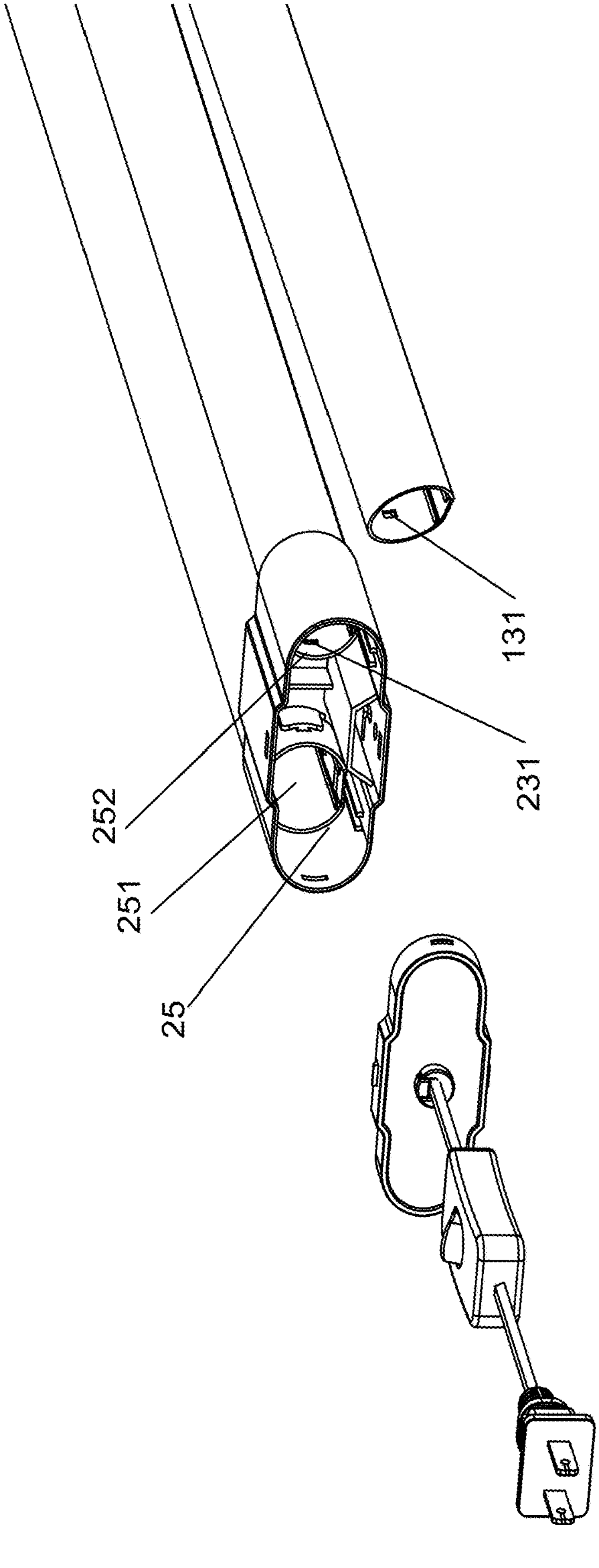
FIG. 7 shows a schematic diagram of an assembly of plugs and a light tube according to one embodiment of the present disclosure.

FIG. 5 is a top cross-sectional view of FIG. 1. FIG. 6 is a left cross-sectional view of FIG. 1. FIG. 7 shows a schematic diagram of an assembly of plugs and a light tube according to one embodiment of the present disclosure. Specific assembly details for the light tube assembly and the plug assembly are detailed in the above description and will not be specified here.

In one embodiment of the present disclosure, the end cap assembly 3 includes an input end cap 31 and an output end cap 32, which are respectively connected to the plugs at the two ends of the light tube assembly.

Each of the input end cap 31 and the output end cap 32 is provided with the fourth snap-fit assembly 33, and the fourth snap-fit assembly 33 is matched and connected with the second snap-fit assembly 22.

The fourth snap-fit assembly 33 includes multiple fourth snap-fit components 331, and the fourth snap-fit components 331 are respectively disposed on the side walls of each of the input end cap 31 and the output end cap 32.

In one implementation, the fourth snap-fit assembly 33 includes at least two pairs of the fourth snap-fit components 331. One pair of the fourth snap-fit components 331 is disposed opposite to each other along a horizontal axis of the end cap assembly, and the other pair of the fourth snap-fit components 331 is disposed opposite to each other along a vertical axis of the end cap assembly, so that the fourth snap-fit assembly 33 can connect to at least two pairs of the second snap-fit components.

That is, the fourth snap-fit components 331 of the input end cap 31 are matched and connected with the second snap-fit components 241 on the inner wall of the first plug 21 close to the first end of the tubular cavity 25. The fourth snap-fit components 331 of the out end cap 32 are matched and connected with the second snap-fit components 241 on the inner wall of the second plug 22 close to the first end of the tubular cavity 25.

Specifically, the input end cap 31 and the output end cap 32 can be quickly matched with the first plug 21 and the second plug 22, respectively, in a snap-fit manner.

In one embodiment of the present disclosure, the second snap-fit components 241 are slots, the fourth snap-fit components 331 are snaps, and the second snap-fit components 241 are matched and connected to the fourth snap-fit components 331.

In one implementation, the second snap-fit assembly 24 includes multiple slots, and the slots are respectively disposed on the inner wall of each of the first plug 21 and the second plug 22 close to the first end of the tubular cavity. The fourth snap-fit assembly 33 includes multiple snaps, and the snaps are respectively disposed on the side walls of each of the input end cap 31 and the output end cap 32.

The snaps of the input end cap 31 are matched and connected with the slots at the opening of the first plug 21, and the snaps of the output end cap 32 are matched and connected with the slots at the opening of the second plug 22.

In one embodiment of the present disclosure, the second snap-fit components 241 are snaps, the fourth snap-fit components 331 are slots, and the second snap-fit components 241 are matched and connected to the fourth snap-fit components 331.

In another implementation, the second snap-fit assembly 24 includes multiple snaps, and the snaps are respectively disposed on the inner wall of each of the first plug 21 and the second plug 22 close to the first end of the tubular cavity. The fourth snap-fit assembly 33 includes multiple slots, and the slots are respectively disposed on the side walls of each of the input end cap 31 and the output end cap 32.

The slots of the input end cap 31 are matched and connected with the snaps at the opening of the first plug 21, and the slots of the output end cap 32 are matched and connected with the snaps at the opening of the second plug 22.

It should be noted that there are no specific limitations on the structure, position, and quantity of the second snap-fit assembly on the first plug and the second plug, as well as the structure, position, and quantity of the fourth snap-fit assembly on the input end cap and the output end cap, provided that the structures and positions of the second snap-fit assembly and the fourth snap-fit assembly match and their quantities are equal.

In one embodiment of the present disclosure, the light tube assembly 1 includes a passive light strip 14, and the end cap assembly is provided with a power supply connection part 34. The passive light strip 14 is electrically connected to a power supply cord 4 via the power supply connection part 34.

In one embodiment of the present disclosure, the power supply connection part 34 includes a first power supply connection part corresponding to the input end cap 31 and a second power supply connection part corresponding to the output end cap 32. The first power supply connection part of the input end cap 31 is a wire clamp **34*a* with a socket, and the inner side of the wire clamp 34*a* is electrically connected to the passive light strip 14 by a wire. The socket is disposed on the outer side of the wire clamp 34*a* to allow for a detachable connection between the wire clamp 34*a* and a power supply plug 5. When in use, the power supply plug 5 can be directly inserted into the socket on the outer side of the wire clamp 34*a* of the input end cap 31** to be secured and clamped, thus facilitating transportation and packaging.

In another embodiment of the present disclosure, the first power supply connection part of the input end cap 31 is a wire hole **34*b* for the power supply cord 4 to insert into the light tube assembly 1 and electrically connect with the passive light strip 14. Users only need to correctly assemble the input end cap 31** with other components during use, which reduces production time and assembly processes on the assembly line, improves installation efficiency, and enhances the user experience.

In one embodiment of the present disclosure, the second power supply connection part of the output end cap 32 is a wire hole **34*b* for an output wire connected to the passive light to pass through. Users only need to correctly assemble the output end cap 32** with other components during use, which reduces assembly processes, improves installation efficiency, and enhances the user experience.

In one implementation, the power supply plug 5 is an AC switch plug.

In one embodiment of the present disclosure, the power supply plug 5 is matched and connected to the wire hole **34*b***.

Specifically, the wire hole **34*b* of the output end cap and the power supply plug 5 connected to the input end cap can match each other, and the power supply plug 5** of the input end cap is compatible with the common sockets.

In one embodiment of the present disclosure, the passive light strip 14 includes a light panel 141, and the light panel 141 is made of a linear high-voltage DOB aluminum substrate.

In one implementation, the light panel 141 includes a first light panel 1411 and a second light panel 1412. The first light panel 1411 is disposed in an inner cavity of the first light tube 11, and the second light panel 1412 is disposed in an inner cavity of the second light tube 12.

In one implementation, the first light panel 1411 is inserted into the first light tube 11 through one of the cylindrical cavities of the first plug 21, and the second light panel 1412 is inserted into the second light tube 12 through another one of the cylindrical cavities of the first plug 21.

In another implementation, the first light panel 1411 is inserted into the first light tube 11 through one of the cylindrical cavities of the second plug 22, and the second light panel 1412 is inserted into the second light tube 12 through another one of the cylindrical cavities of the second plug 22.

In one implementation, the light panel adopts a linear high-voltage DOB solution that can be directly connected to AC mains.

Specifically, the light panel is inserted into the channel of the light tube through the tubular cavity of the plug, and the light panel is a panel adhered with LED light beads and electronic components, which is made of an aluminum substrate, facilitating heat dissipation. The LED light source shares the aluminum substrate with the driver and other electronic components, reducing the assembly and soldering work for the power supply.

In one embodiment of the present disclosure, the light tube assembly 1 adopts a dual-color extrusion structure design with a wavy strip structure at the bottom.

Specifically, the wave stripe at the bottom of the light tube can help dissipate heat from the LED light source.

Figure 8:
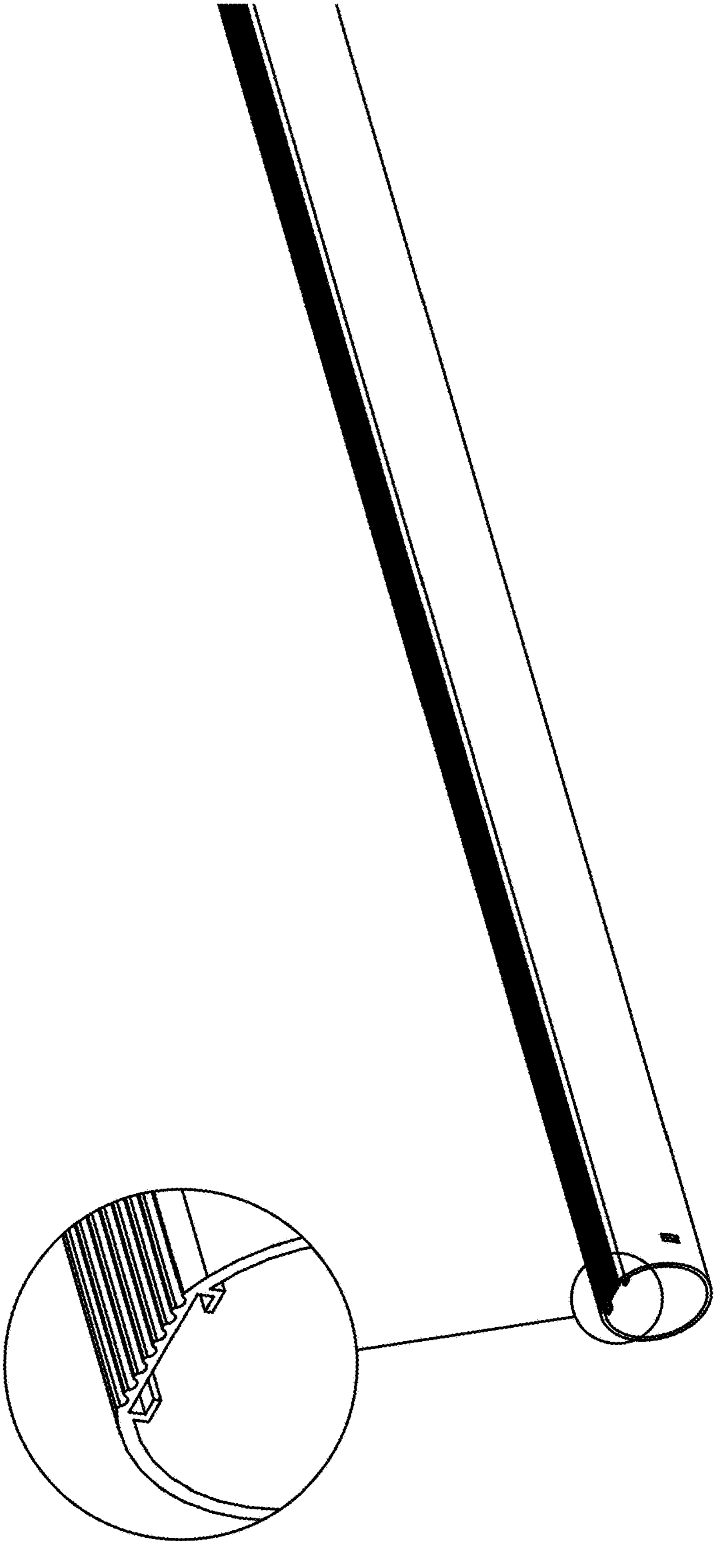
FIG. 8 is a schematic diagram of a bottom of a light tube according to one embodiment of the present disclosure.

FIG. 8 is a schematic diagram of a bottom of the light tube according to one embodiment of the present disclosure.

In one embodiment of the present disclosure, the light tube assembly 1 is made of PC material or Nano material.

In one embodiment of the present disclosure, the plugs 2 and the end cap assembly 3 are made of PC material.

In an embodiment of the present application, the plugs 2 are provided with a cruciform opening slot (not shown in the drawings) at the back.

Specifically, the backs of the plugs in the present disclosure are provided with a cruciform opening slot, which, with the accompanying accessories, can achieve either suspension or ceiling-mounted installation methods.

In one embodiment of the present disclosure, the installation sequence for the components of the bracket light is as follows:

One end of the first light tube 11 and one end of the second lamp 12 are connected to the first plug 21 in a snap-fit manner, while the other ends of the first light 11 and the second light tube 12 are connected to the second plug 22 in a snap-fit manner. The connecting bosses 252 of the inner walls of the first plug 21 and the second plug 22 are provided with snaps 231 (snap bosses), and the ends of the first light tube 11 and the second light tube 12 are respectively provided with slots 131 (open slots). The snaps 231 are matched with the slots 131, serving to secure the assembly (see FIG. 7 for more details).

The first light source panel 1411 is inserted into the first light tube 11 through one of the cylindrical cavities of the first plug 21, and the second light source panel 1412 is inserted into the second light tube 12 through another one of the cylindrical cavities of the first plug 21, and then the wires to be connected are soldered. The AC switch plug cord is secured and clamped through the hole on the bottom of the input end cap 31 via the wire clamp. This step can be pre-processed to reduce production time on the assembly line and increase assembly efficiency.

In another implementation, the first light panel 1411 is inserted into the first light tube 11 through one of the cylindrical cavities of the second plug 22, and the second light panel 1412 is inserted into the second light tube 12 through the another one of the cylindrical cavities of the second plug 22.

Figure 3:
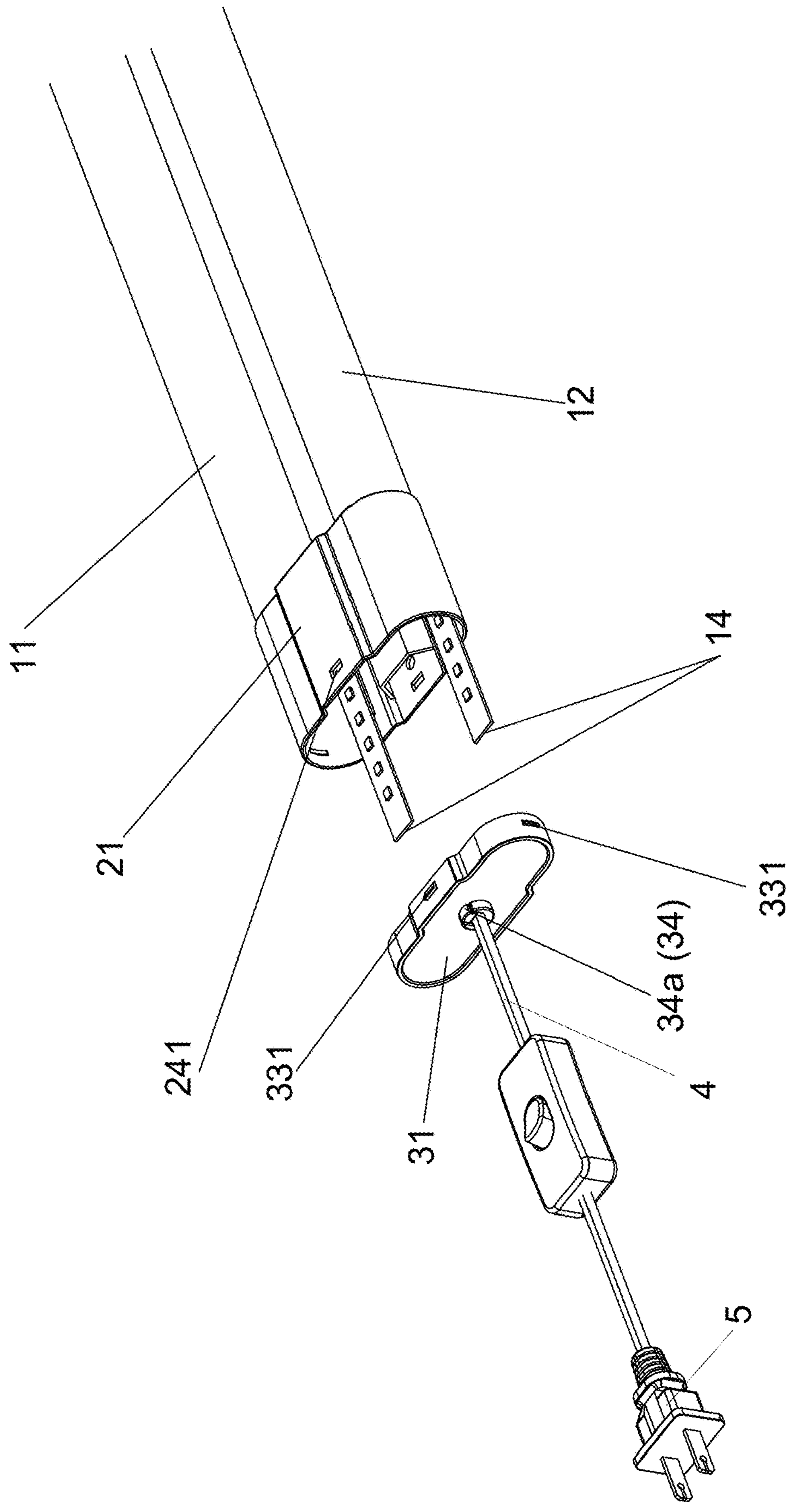
FIG. 3 is a schematic assembly diagram of an input end cap according to one embodiment of the present disclosure.
Figure 4:
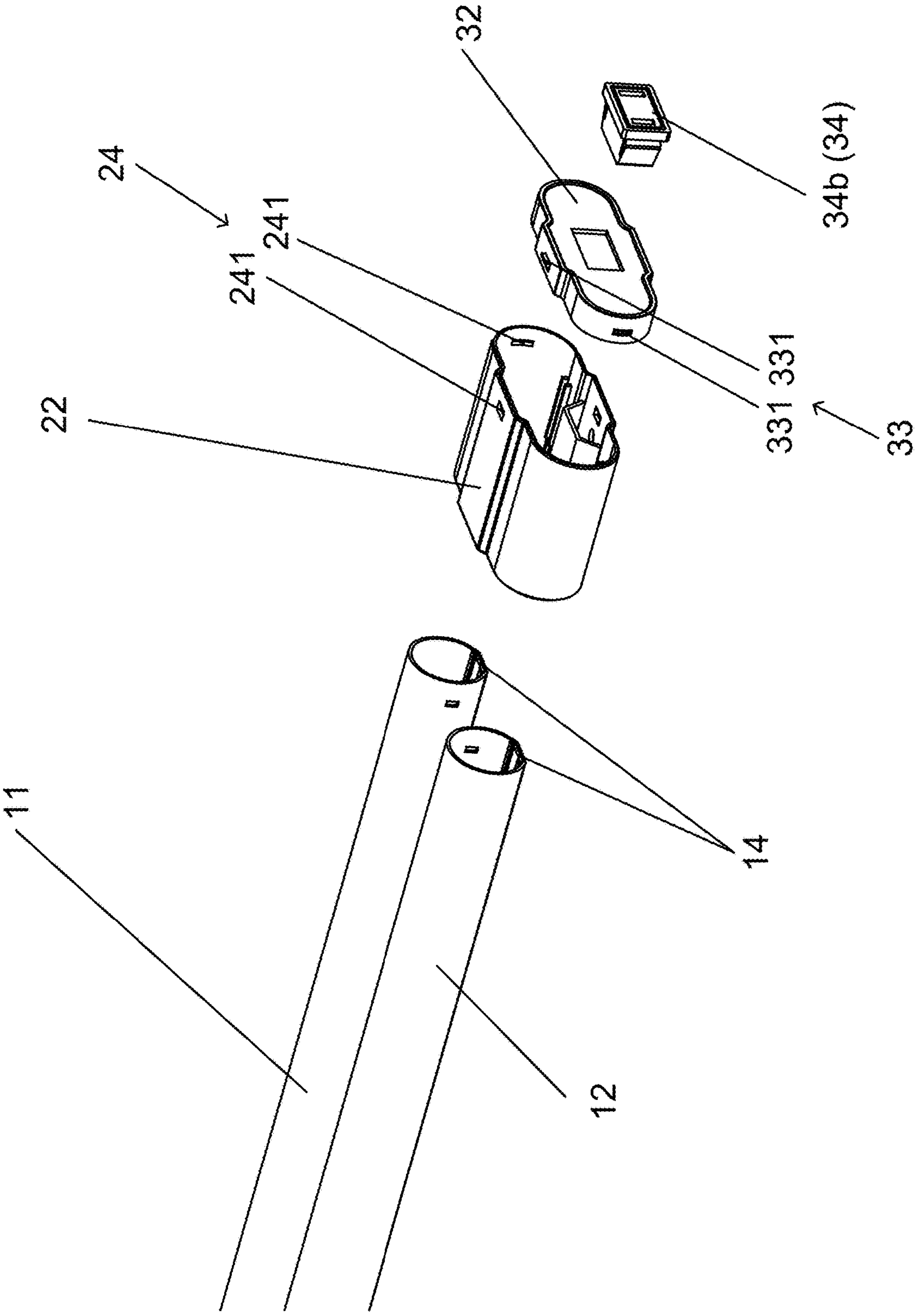
FIG. 4 is a schematic assembly diagram of an output end cap according to one embodiment of the present disclosure.

After soldering the input wires to the pre-processed input end cap 31, the input end cap 31 is matched and connected with the first plug 21 via the four snaps on the side walls of the input end cap 31 (see FIG. 3 for more details). The pre-processed output end cap 32 at the other end is also matched and connected with the second plug 22 via the four snaps on the side walls of the output end cap 32 (see FIG. 4 for details).

The input end cap 31 is provided with snap bosses on the top, bottom, and sides. The snap bosses adopt a stepped design for quick assembly and matching.

A square opening is provided at the bottom of the output end cap 32, and matched with the power supply plug 5. The output end cap 32 is provided with snap bosses on the top, bottom, and sides. The snap bosses adopt a stepped design for quick assembly and matching (see FIG. 4 for details).

It should be noted that the structures of the snap and slot described in the embodiments of this application are not limited to those provided in the examples. Any compatible snap and slot structure can be applied to the bracket lamp module designed for ease of assembly as described in this application.

As described above, the easily-assembled bracket light module of the present disclosure has the following beneficial effects:

The plugs in the present disclosure are respectively matched and connected to the light tube assembly and the end cap assembly in a snap-fit manner. This allows for rapid assembly, ensures high efficiency, and enhances the user experience. Meanwhile, the input end cap and the output end cap both adopt a screwless snap-fit design for quick assembly and compatibility, and the snap-fit design meets the certification requirements for the pull force test.

The input end cap and the output end cap in the present disclosure facilitate the welding of input and output wires, while the input end cap and the output socket can be pre-processed in advance.

The light tube and the plugs in the present disclosure can be quickly assembled by a snap-fit.

The light tube in the present disclosure adopts a dual-color extrusion structure design with a wavy strip structure at the bottom, which can assist in the heat dissipation of the LED light source.

The light panel in the present disclosure adopts a linear high-voltage DOB scheme, while the driver and the LED light panel share a common substrate, eliminating the need for welding operations and reducing the drive assembly welding process.

The backs of the plugs in the present disclosure are provided with a cruciform opening slot, which, with the accompanying accessories, can achieve either suspension or ceiling-mounted installation methods.

The descriptions of the processes or structures corresponding to the above figures each have their emphasis. Parts that are not detailed in one process or structure can be referenced in the relevant descriptions of other processes or structures.

The embodiments described above serve merely as illustrative examples of the principles and effects of the present disclosure, and are not intended to serve as limitations on the invention. People skilled in the art may modify or alter these embodiments without departing from the spirit and scope of the present disclosure. Therefore, any equivalent modifications or alterations made by those skilled in the art, which are consistent with the spirit and technical concepts disclosed in the present disclosure, shall still fall within the scope of the claims of the present disclosure.

The invention claimed is:

1. An easily-assembled bracket light module, comprising:

plugs, wherein the plugs are provided with a first snap-fit assembly and a second snap-fit assembly;

a light tube assembly, wherein the light tube assembly is provided with a third snap-fit assembly, which is matched and connected with the first snap-fit assembly to connect the light tube assembly to the plugs; and an end cap assembly, wherein the end cap assembly is provided with a fourth snap-fit assembly, which is matched and connected with the second snap-fit assembly to connect the end cap assembly to the plugs;

wherein an inner wall of each of the plugs forms a tubular cavity with openings at both ends;

wherein the second snap-fit assembly comprises at least two second snap-fit components, wherein the second snap-fit components are respectively disposed on the inner wall of each of the plugs close to a first end of the tubular cavity.

2. The bracket light module according to claim 1, wherein the tube assembly comprises a passive light strip, and the end cap assembly is provided with a power supply connection part, wherein the passive light strip is electrically connected to a power supply cord via the power supply connection part.

3. The bracket light module according to claim 2, wherein the end cap assembly comprises an input end cap and an output end cap, wherein the input end cap and the output end cap are respectively connected to the plugs at two ends of the light tube assembly; wherein the power supply connection part comprises a first power supply connection part corresponding to the input end cap and a second power supply connection part corresponding to the output end cap;

wherein the first power supply connection part of the input end cap is a wire clamp with a socket, an inner side of the wire clamp is electrically connected to the passive light strip by a wire, and the socket is disposed on an outer side of the wire clamp to allow for a detachable connection between the wire clamp and a power supply plug; or the first power supply connection part of the input end cap is a wire hole for the power supply cord to insert into the light tube assembly and electrically connect with the passive light strip;

wherein the second power supply connection part of the output end cap is a wire hole for an output wire connected to the passive light strip to pass through.

4. The bracket light module according to claim 1, wherein at least two pairs of the second snap-fit components are provided, and one pair of the second snap-fit components is disposed opposite to each other along a horizontal axis of an end surface of the tubular cavity, while the other pair of the second snap-fit components is disposed opposite to each other along a vertical axis of the end surface of the tubular cavity.

5. The bracket light module according to claim 4, wherein the fourth snap-fit assembly comprises at least two pairs of the fourth snap-fit components, and one pair of the fourth snap-fit components is disposed opposite to each other along a horizontal axis of the end cap assembly, while the other pair of the fourth snap-fit components is disposed opposite to each other along a vertical axis of the end cap assembly, so that the fourth snap-fit assembly can connect to the at least two pairs of the second snap-fit components.

6. The bracket light module according to claim 1, wherein the tubular cavity includes N cylindrical cavities connected to each other, and the inner wall of each of the plugs is provided with at least one connecting boss that protrudes into the interior of at least one of the cylindrical cavities at each connection point between two adjacent cylindrical cavities of the N cylindrical cavities; wherein $N \geq 2$, and N is an integer;

wherein the first snap-fit assembly comprises at least two first snap-fit components disposed on the connecting boss.

7. The bracket light module according to claim 6, wherein the light tube assembly comprises N light tubes;

wherein the third snap-fit assembly comprises a plurality of third snap-fit components disposed at ends of each of the light tubes;

wherein each of the light tubes is inserted into one of the cylindrical cavities, and the light tube assembly is connected to the plugs via the snaps of each of the plurality of third snap-fit components and the first snap-fit components.

8. The bracket light module according to claim 2, wherein the passive light strip comprises a light panel, wherein the light panel is made of a linear direct-on-board (DOB) aluminum substrate.

9. The bracket light module according to claim 1, wherein the light tube assembly adopts a dual-color extrusion structure design with a wavy strip structure at a bottom of the light tube assembly.

* * * * *